US008290683B2

(12) United States Patent
Luppold

(10) Patent No.: US 8,290,683 B2
(45) Date of Patent: Oct. 16, 2012

(54) APPARATUS AND METHOD FOR REDUCING AIRCRAFT FUEL CONSUMPTION

(75) Inventor: Robert Humes Luppold, West Newton, PA (US)

(73) Assignee: Telectro-Mek, Inc., Fort Wayne, IN (US)

( * ) Notice: Subject to any disclaimer, the term of this patent is extended or adjusted under 35 U.S.C. 154(b) by 336 days.

(21) Appl. No.: 12/658,817

(22) Filed: Feb. 16, 2010

(65) Prior Publication Data
US 2011/0202251 A1 Aug. 18, 2011

(51) Int. Cl.
G06F 7/00 (2006.01)
G06F 19/00 (2006.01)
F02K 3/00 (2006.01)

(52) U.S. Cl. ............... 701/100; 701/3; 60/243; 340/945

(58) Field of Classification Search .................. 701/100
See application file for complete search history.

(56) References Cited

U.S. PATENT DOCUMENTS

| | | | |
|---|---|---|---|
| 3,403,507 A | 10/1968 | Schuster | |
| 3,526,091 A | 9/1970 | Schuster | |
| 3,579,992 A * | 5/1971 | Urban et al. | 60/239 |
| 3,600,888 A | 8/1971 | Nethken et al. | |
| 3,758,764 A * | 9/1973 | Harner | 701/100 |
| 3,764,785 A * | 10/1973 | Harner et al. | 700/282 |
| 3,852,956 A | 12/1974 | Martin | |
| 4,038,526 A | 7/1977 | Eccles et al. | |
| 4,063,072 A * | 12/1977 | Sochtig et al. | 701/99 |
| 4,100,731 A | 7/1978 | Janes et al. | |
| 4,136,517 A | 1/1979 | Brown | |
| 4,159,088 A * | 6/1979 | Cosley | 244/182 |
| 4,220,993 A | 9/1980 | Schloeman | |
| 4,258,545 A | 3/1981 | Slater | |
| 4,270,346 A * | 6/1981 | Dawson | 60/243 |
| 4,294,069 A * | 10/1981 | Camp | 60/238 |
| 4,296,601 A | 10/1981 | Martin | |
| 4,325,123 A * | 4/1982 | Graham et al. | 701/110 |
| 4,380,148 A | 4/1983 | Burrage et al. | |
| 4,410,948 A * | 10/1983 | Doniger et al. | 701/99 |
| 4,425,614 A * | 1/1984 | Barron et al. | 700/38 |
| 4,437,303 A | 3/1984 | Cantwell | |
| 4,522,025 A | 6/1985 | Greune et al. | |

(Continued)

OTHER PUBLICATIONS

Bardone et al., Actuation System for Variable Exhaust Nozzle and Inlet Guide Vanes on an Advanced Gas Turbine Engine, 1998, Presented at the 1998 RTO AVT Symposium on Design Principles and Methods for Aircraft Gas Turbine Engines, pp. 7-1-7-17 [retrieved on Mar. 28, 2012].*

(Continued)

Primary Examiner — Michael J. Zanelli
(74) Attorney, Agent, or Firm — George Pappas

(57) ABSTRACT

A method and apparatus for improving fuel efficiency in an aircraft having a digital avionics system and at least first and second engines. The avionics system includes first and second full-authority digital engine control (FADEC) systems and corresponding first and second engines. At least one processor is provided that is programmed with a differential specific fuel consumption (DSFC) algorithm and first and second engine optimization algorithms. The DSFC algorithm adjusts the throttle of the first and second engines to substantially equalize the differential specific fuel consumption of the engines and thereby improve the fuel efficiency of the aircraft. The first and second engine optimization algorithms adjust at least one operating parameter of the first and second engines respectively to improve the fuel efficiency of the first and second engines.

28 Claims, 4 Drawing Sheets

U.S. PATENT DOCUMENTS

| | | | |
|---|---|---|---|
| 4,546,353 A * | 10/1985 | Stockton | 340/966 |
| 4,551,972 A | 11/1985 | Lewis | |
| 4,644,744 A | 2/1987 | Mittendorf et al. | |
| 4,814,993 A * | 3/1989 | Zapryanov et al. | 701/123 |
| 4,875,168 A | 10/1989 | Martin | |
| 4,912,642 A | 3/1990 | Larsen et al. | |
| 5,006,993 A * | 4/1991 | Virnig et al. | 701/99 |
| 5,029,778 A * | 7/1991 | DeLuca | 244/234 |
| 5,039,037 A * | 8/1991 | DeLuca | 244/234 |
| 5,050,081 A * | 9/1991 | Abbott et al. | 701/14 |
| 5,076,048 A * | 12/1991 | Boston | 60/39.281 |
| 5,133,182 A * | 7/1992 | Marcos | 60/792 |
| 5,165,240 A | 11/1992 | Page | |
| 5,261,227 A * | 11/1993 | Giffin, III | 60/226.1 |
| 5,285,638 A | 2/1994 | Russ | |
| 5,379,583 A * | 1/1995 | Zickwolf, Jr. | 60/794 |
| 5,835,879 A * | 11/1998 | Bush | 701/123 |
| 6,463,380 B1 * | 10/2002 | Ablett et al. | 701/100 |
| 6,532,412 B2 * | 3/2003 | Adibhatla et al. | 701/100 |
| 6,742,742 B2 | 6/2004 | Claudet | |
| 6,823,253 B2 * | 11/2004 | Brunell | 701/100 |
| 7,082,767 B2 | 8/2006 | Guillot-Salomon et al. | |
| 7,142,131 B2 * | 11/2006 | Sikora | 340/971 |
| 7,148,814 B2 * | 12/2006 | Sikora et al. | 340/945 |
| 2005/0028513 A1 | 2/2005 | Guillot-Salomon et al. | |
| 2009/0012762 A1 * | 1/2009 | Ellis et al. | 703/7 |
| 2010/0057957 A1 * | 3/2010 | Smilg et al. | 710/104 |
| 2010/0241331 A1 * | 9/2010 | Duke et al. | 701/100 |
| 2010/0292870 A1 * | 11/2010 | Saint Marc et al. | 701/3 |

OTHER PUBLICATIONS

Kreiner et al., The Use of Onboard Real-Time Models for Jet Engine Control, 2003, MTU Aero Engines, Germany, pp. 1-27 [retrieved on Mar. 28, 2012 from http://www.mtu.ag/en/technologies/engineering_news/development/Kreiner_Onboard_real-time_models_en.pdf].*

Behbahani et al., Multi-Core Processors: An Enabling Technology for Embedded Distributed Model-Based Control, 2008, 44th AIAA Joint Propulsion Conference, pp. 1-11 [retrieved on Mar. 30, 2012 from http://www.dtic.mil/cgi-bin/GetTRDoc?AD=ADA486577].*

* cited by examiner

APPARATUS AND METHOD FOR REDUCING AIRCRAFT FUEL CONSUMPTION

BACKGROUND OF THE INVENTION

The present invention relates to an apparatus and method for reducing aircraft fuel consumption.

The operation of an aircraft involves significant fuel costs. Improving the fuel efficiency of an aircraft to reduce its fuel consumption, if it can be done without impairing the operation of the aircraft, is a desirable goal. One known manner of improving aircraft fuel efficiency involves equalizing the differential specific fuel consumption as disclosed in U.S. Pat. No. 5,285,638 the disclosure of which is expressly incorporated herein by reference. The implementation of the method and apparatus disclosed in this earlier patent, however, requires the installation of additional sensors that are not typically found on aircraft. This requirement makes the implementation of the disclosed method and apparatus cumbersome and the disclosed method and apparatus has not been widely adopted.

A relatively easily implemented means of improving the fuel efficiency of an aircraft remains desirable.

SUMMARY OF THE INVENTION

The present invention provides an apparatus and method for improving the fuel efficiency of an aircraft by adjusting the operating parameters of the individual engines of the aircraft and adjusting the throttle of each of the aircraft's engines to substantially equalize the differential specific fuel consumption of the engines.

The invention comprises, in one form thereof, a method for improving fuel efficiency in an aircraft having a digital avionics system and at least first and second engines wherein the digital avionics system communicates first control signals from a first full-authority digital engine control (FADEC) system to the first engine to thereby control operating parameters of the first engine and communicates second control signals from a second full-authority digital engine control (FADEC) system to the second engine to thereby control operating parameters of the second engine. The method includes providing at least one processor programmed with a differential specific fuel consumption (DSFC) algorithm, a first engine optimization algorithm and a second engine optimization algorithm. The at least one processor is communicatively coupled with the first FADEC system and the second FADEC system wherein implementation of the DSFC algorithm, first engine optimization algorithm and second engine optimization algorithm by the at least one processor during operation of the aircraft includes: (a) determining first and second desired thrust values for the first and second engines respectively as a function of estimated differential specific fuel consumption of each of the first and second engines with the DSFC algorithm; determining first and second DSFC throttle adjustments for the first and second engines respectively as a function of the first and second desired thrust values and contemporaneous estimated thrust values for the first and second engines; and communicating the first and second DSFC throttle adjustments to the first and second FADEC systems respectively; (b) determining a first adjustment to at least one operating parameter of the first engine as a function of fuel efficiency and the desired first thrust value for the first engine with the first engine optimization algorithm and communicating the first adjustment to the first FADEC system; and (c) determining a second adjustment to at least one operating parameter of the second engine as a function of fuel efficiency and the desired second thrust value for the second engine with the second engine optimization algorithm and communicating the second adjustment to the second FADEC system.

The invention comprises, in another form thereof, a method for improving fuel efficiency in an aircraft having a digital avionics system and at least first and second engines wherein the digital avionics system communicates first control signals from a first full-authority digital engine control (FADEC) system to the first engine to thereby control operating parameters of the first engine and communicates second control signals from a second full-authority digital engine control (FADEC) system to the second engine to thereby control operating parameters of the second engine, and wherein each of the first and second FADEC systems include a control laws program that generates initial engine control commands as a function of a received throttle value and an engine model program that estimates performance values for an associated one of the engines as a function of received engine control signals, the estimated performance values including a contemporaneous estimated thrust value. The method includes communicating an externally generated throttle value to each FADEC and providing at least one processor programmed with a differential specific fuel consumption (DSFC) algorithm, a first engine optimization algorithm and a second engine optimization algorithm. The method also includes communicatively coupling the at least one processor with the first FADEC system and the second FADEC system wherein implementation of the DSFC algorithm, first engine optimization algorithm and second engine optimization algorithm by the at least one processor during operation of the aircraft includes: (a) determining first and second desired thrust values for the first and second engines respectively as a function of estimated differential specific fuel consumption of each of the first and second engines and the externally generated throttle values with the DSFC algorithm; determining first and second DSFC throttle adjustments for the first and second engines respectively as a function of the first and second desired thrust values and the contemporaneous estimated thrust values for the first and second engines; and communicating the first and second DSFC throttle adjustments to the first and second FADEC systems respectively wherein the first and second DSFC throttle adjustments are combined with a respective one of the externally generated throttle values to define an adjusted throttle value and the adjusted throttle values are communicated to the control laws module of each FADEC system for use in determining initial engine control commands; (b) determining a first adjustment to at least one operating parameter of the first engine corresponding to at least one of the engine control command signals generated by the control law program of the first FADEC system; the first adjustment being determined as a function of fuel efficiency and the first desired thrust value for the first engine with the first engine optimization algorithm and communicating the first adjustment to the first FADEC system; defining at least one of the first control signals as a function of one of the initial engine control commands generated by the control law program of the first FADEC and the first adjustment; communicating the at least one first control signal to the engine model program of the first FADEC and using the at least one first control signal in the determination of the contemporaneous estimated thrust value for the first engine; and communicating the contemporaneous estimated thrust value for the first engine to the at least one processor for use in the DSFC algorithm and the first engine optimization algorithm; and (c) determining a second adjustment to at least one operating parameter of the second engine corresponding to at least one of the engine control command signals generated by the control law program of the second FADEC system; the second adjustment being determined as a function of fuel efficiency and the second desired thrust value for the second engine with the second engine optimization program and communicating the second adjustment to the second FADEC system; defining at least one of the second control signals as a function of one of the initial engine control commands generated by the control law program of the second FADEC and the second adjustment; communicating the at least one second control signal to the engine model program of the second FADEC and using the at least one second control signal in the determination of the contemporaneous estimated thrust value for the second engine; and communicating the contemporaneous estimated thrust value for the second engine to the at least one processor for use in the DSFC algorithm and the second engine optimization algorithm.

The invention comprises, in yet another form thereof, a computational module installable in an aircraft having a digital avionics system and at least first and second engines. The digital avionics system communicates first control signals from a first full-authority digital engine control (FADEC) system to control operating parameters of the first engine and communicates second control signals from a second full-authority digital engine control (FADEC) system to control operating parameters of the second engine. The digital avionics system further includes first and second engine model programs for estimating performance of the first and second engines respectively. The computational module includes at least one processor programmed with a DSFC algorithm, a first engine optimization algorithm and a second engine optimization algorithm. The at least one processor is communicatively couplable with the first FADEC system and the second FADEC system. When the DSFC algorithm, the first engine optimization algorithm and said second engine optimization algorithm are implemented by said at least one processor during operation of the aircraft, the at least one processor: (a) determines first and second desired thrust values for the first and second engines respectively as a function of estimated differential specific fuel consumption of each of the first and second engines with the DSFC algorithm; determines first and second DSFC throttle adjustments for the first and second engines respectively as a function of the first and second desired thrust values and contemporaneous estimated thrust values for the first and second engines obtained from the first and second engine models respectively; and communicates the first and second DSFC throttle adjustments to the first and second FADEC systems respectively; (b) determines a first adjustment to at least one operating parameter of the first engine as a function of fuel efficiency and the desired first thrust value for the first engine with the first engine optimization algorithm and communicates the first adjustment to the first FADEC system; and (c) determines a second adjustment to at least one operating parameter of the second engine as a function of fuel efficiency and the desired second thrust value for the second engine with the second engine optimization algorithm and communicates the second adjustment to the second FADEC system.

BRIEF DESCRIPTION OF THE DRAWINGS

The above mentioned and other features of this invention, and the manner of attaining them, will become more apparent and the invention itself will be better understood by reference to the following description of an embodiment of the invention taken in conjunction with the accompanying drawings, wherein.

Figure 1:
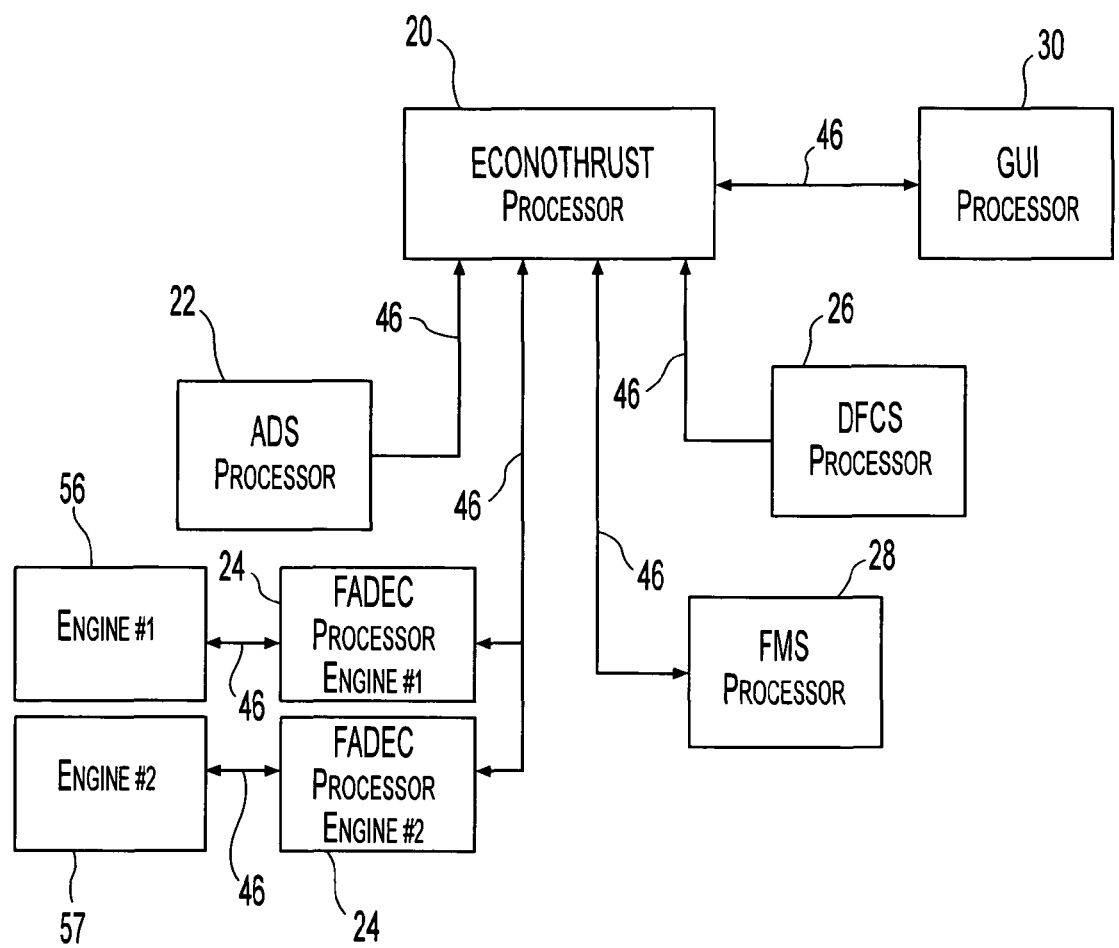
FIG. 1 is a schematic representation of the engines and digitial avionics system of an aircraft employing the present invention.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DETAILED DESCRIPTION OF THE INVENTION

The present invention utilizes the digital computer systems and information technology found in the highly integrated digital avionics system of many contemporary aircraft to implement an algorithm for improving fuel efficiency. As discussed in greater detail below, only a minimal amount of additional hardware must be installed in such aircraft to implement the fuel efficiency methods disclosed herein.

Many aircraft engines flying today employ a full authority digital engine control (FADEC) system and contain on-board engine models capable of accurately estimating engine thrust. By utilizing these features found in contemporary aircraft, the present invention can be implemented in such aircraft after installing an additional computing platform referred to herein as the ECONOTHRUST processor. The ECONOTHRUST processor will communicate with the FADEC and other digital avionics aircraft systems via serial data buses, e.g., ARINC 429/629 in commercial aircraft and Mil. Std. 1553/IEEE 1394 (Fire-Wire) in military aircraft, which have become de facto standards in digital avionics architectures.

The wealth of information available in contemporary digital avionics system will allow the fuel efficiency algorithm of the present invention to pursue an aggressive search for a minimum differential specific fuel consumption (DSFC) value. As discussed below, this will be accomplished by the coherent fusion of various information sources. It is generally accepted that the fusion of complementary information sources produces an output whose accuracy metrics are improved over those produced by the individual elements used in the fusion process. Neural net and fuzzy logic technologies are useful tools in systematically formulating the implementation of the information fusion concept.

The serial bus architecture illustrated in the Figures and discussed below will provide the data paths for sharing information to a fusion center that can reside in the ECONOTHRUST processor. This will be particularly attractive in military engine applications. The fusion center can tailor the fuel optimization algorithms so that they take into account operational regimes, mission objectives, geographic location, etc. The fusion center will transform information into intelligence that enables the ability of its optimization algorithms to favorably adapt to a wide range of operating conditions.

With the emergence of powerful embedded computational systems, self-tuning, on-board, real-time engine models have become feasible and are currently installed on many military and commercial engines today. One of the output estimates produced by the engine model is net thrust. The availability of an accurate engine thrust estimate resident in the FADEC is a feature of such systems that is exploited by the present invention. The accuracy of such thrust estimates will generally meet the requirements for optimizing thrust-specific fuel consumption at cruise conditions.

The Joint Strike Fighter (JSF) under development by the US Air Force, Navy, and Marines closes control loops around the engine model thrust estimate during vertical landing maneuvers. Both Pratt-Whitney and General Electric make extensive use of these on-board models for analytic fault detection and isolation as well as gas path diagnostics. The serial link connecting the FADEC to the ECONOTHRUST processor provides a data path for collecting thrust and other performance-related information for all of the aircraft's engines.

Turning now to FIG. 1, the general architecture of the system will be discussed. The ECONOTHRUST processor 20 and five computational platforms are shown in FIG. 1. These five processors represent a generic integrated avionics system architecture common to most commercial and military aircraft flying today. These common building blocks include:
a) Air Data System (ADS) processor 22,
b) Full-Authority Digital Engine Control (FADEC) system processor 24 for each engine 56, 57,
c) Digital Flight Control System (DFCS) processor 26,
d) Flight Management System (FMS) processor 28, and
e) Graphical User Interface (GUI) processor 30 that provides an intuitive mechanism for the aircraft operators to interact with the integrated avionics system.

These processors share information over standardized serial data communication links 46 where data flow can be either bidirectional (Mil Std 1553) or unidirectional (ARINC 429 buses require separate wires for transmitting and receiving). It is noted that the use of the term processor herein is not meant to indicate a single processor but may refer to either a single processor or multiple processors. It is also not limited to any one form of processor or computing platform but may take the form of any suitable device for the processing tasks it is required to perform.

The Air Data System (ADS) is typically equipped with sensors for measuring outside (ambient) air temperature, static free stream pressure, impact (differential) pressure, and aircraft angle of attack. In general, most aircraft are not equipped with a transducer for measuring angle of side-slip, but instead estimate this quantity from flight control system inertial instrumentation. From the ECONOTHRUST processor 20 perspective, the most important output produced by ADS is its estimate of the aircraft's true airspeed (TAS). One of the constraints placed on the ECONOTHRUST fuel optimization algorithm is that the desired velocity of the aircraft must be maintained during the search for the minimum Differential Specific Fuel Consumption (DSFC). The ADS will provide the feedback information (TAS) needed to enforce this constraint in driving the optimization algorithm toward an acceptable solution.

Each engine FADEC of a contemporary aircraft is typically equipped with an instrumentation suite that measures all of the engine control inputs and outputs required to insure stability and good performance of the aircraft's propulsion system. This instrumentation suite will generally include, fuel flow, variable geometry settings, compressor stability bleeds, rotor speeds, gas path temperature and pressures at critical engine stations, and inlet conditions. In addition to these measurements, an industry trend is to equip the FADEC with an on-board engine model. To ensure the accuracy of the model over the engine life-cycle, on-board models incorporate a self-tuning capability, that is, these models are capable of estimating incremental changes in gas path component efficiency and airflow capacity. This self tuning information explicitly indicates the level of deterioration of a specific engine and is exploited by some embodiments of the ECONOTHRUST algorithm. Having access to this information should significantly simplify the search for an optimal engine combination that minimizes fuel consumption while simultaneously meeting the desired thrust requirement. The ECONOTHRUST system must also interact with the FADEC by sending incremental changes to the engine throttle. The insertion of these differential throttle commands allows the ECONOTHRUST system to realize a fuel consumption reduction.

The communication of the throttle commands from the ECONOTHRUST processor elevates the ECONOTHRUST subsystem to a flight critical status which will have a significant cost impact on the hardware and software required to implement this system, i.e., these components will have to satisfy DO-254 (hardware) and DO-178B (software) standards for flight certification. Moreover, methodologies for detecting ECONOTHRUST hardware and/or software anomalies (faults) will have to be designed, validated, and verified to satisfy FADEC reliability specifications. If the root cause of a fault can be isolated to the ECONOTHRUST hardware/software, then the option of disabling ECONOTHRUST can be exercised since ECONOTHRUST is not required to fly the aircraft. The ability to exercise this option and disable the ECONOTHRUST system will eliminate the two-fault-tolerant reliability requirement generally associated with flight critical systems. This will significantly impact the cost of ECONOTHRUST systems.

The Digital Flight Control System (DFCS) has become a common avionic subsystem in nearly all commercial and military aircraft. DFCS information is used in the implementation of the ECONOTHRUST system. In a multi-engine aircraft, the ECONOTHRUST algorithm will generally produce a different thrust request for each engine in its attempt to minimize fuel consumption resulting in an overall asymmetric thrust on the aircraft. This in turn will induce a disturbance torque in the aircraft's horizontal plane that the DFCS will counteract with a control effector to maintain aircraft heading. The displacement of the control effector from its trim position will introduce additional residual drag on the aircraft which will in turn requires more thrust to maintain the prescribed cruise velocity. The ECONOTHRUST and DFCS must interact so that a compromise solution can be achieved. The incorporation of a multi-tiered ECONOTHRUST algorithm described below seeks to minimize the detrimental drag caused by asymmetrical thrust.

The Flight Management System (FMS) can encompass a potpourri of functions, but the two primary functions of interest for the ECONOTHRUST application are the navigation and guidance subsystems. From these subsystems, the complete state of the aircraft (i.e., position, velocity, and attitude) can be extracted. The aircraft state in conjunction with the ADS and DFCS information sources provide a complete description of the forces and moments being applied to the aircraft at any given point in time. In this information-rich environment, the effects of any ECONOTHRUST decision can be readily assessed and hence adapted to meet a wide variety of situations. The implication is that the ECONOTHRUST subsystem is potentially deployable in not only a steady-state cruise application but also in more dynamic situations. An expanded scope of use for the ECONOTHRUST subsystem could result in additional fuel savings for the user.

Figure 2:
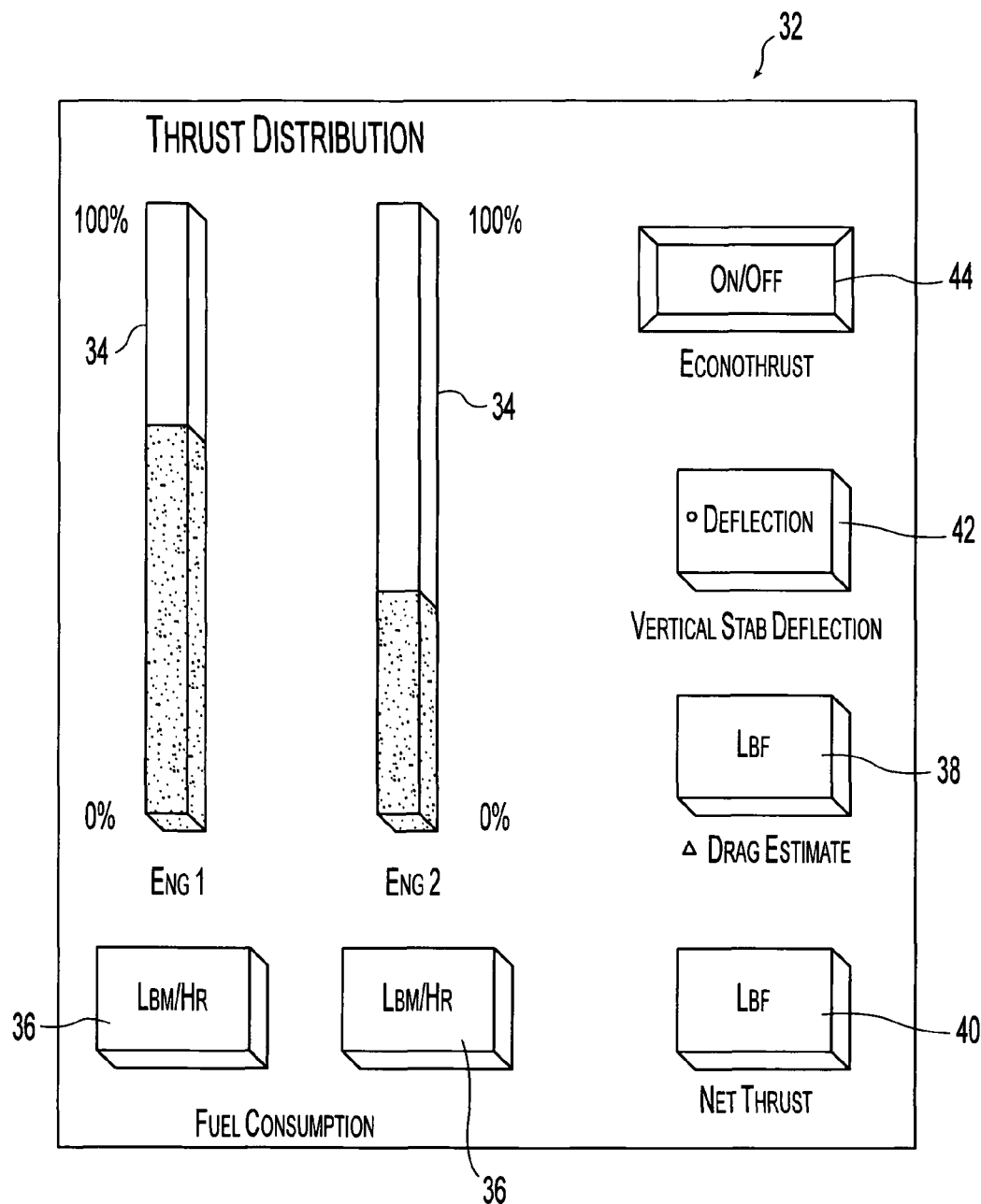
FIG. 2 is a view of a graphical user interface employable with the present invention.

The Graphical User Interface (GUI) subsystem provides an intuitive, easy to use mechanism for pilots to interact with the ECONOTHRUST algorithm. FIG. 2 illustrates one example of a GUI interface 32 that can be used with the present invention. In this application, it is helpful to convey to the pilots the benefits and side effects of engaging the ECONOTHRUST subsystem on their aircraft. The displayed information will advantageously include the estimated thrust produced by each engine and the thrust distribution for the engines (display elements 34), each engine's fuel consumption (display elements 36), and incremental increase in induced aircraft drag to counteract the asymmetric thrust configuration, i.e., A Drag Estimate (display element 38). Also shown in GUI interface 32 is the net thrust (display element 40); vertical stabilizer deflection (display element 42) and a status indicator (display 44) indicating whether or not the ECONOTHRUST system has been activated. Various other forms of information can also be displayed in alternative embodiments. The display 32 illustrated in FIG. 2 corresponds to a two-engine aircraft.

The GUI can be multifunctional so that it provides the minimal amount of information for operational use, as well as more detailed screens that can be used for diagnostics, system analysis, and provide Internet web-connectivity when the aircraft is on the ground. The ability to externally port data that the ECONOTHRUST subsystem has collected in flight to a central database for post-processing/data mining will provide a vehicle for optimizing the ECONOTHRUST algorithm across entire fleets of aircraft and engine types.

Now that we have discussed the architectural features of the ECONOTHRUST system, we will turn now to the basic underlying principles of the DSFC fuel minimization algorithm. The first important point is the definition of differential specific fuel consumption which is given by the following equation:

$$DSFC_i \doteq \frac{dW_i}{dF_i}$$
$$i = 1, 2, \ldots, n$$

where $W_i$ is the ith engine fuel flow, $F_i$ is the ith engine net thrust, the d-symbol prefixed to W & F represents a mathematical differential operator, and n is the number of aircraft engines.

The second key point is the DSFC fuel minimization objective which requires an adjustment of fuel flow in each engine until all of the $DSFC_i$ are equal. The fuel flow adjustment is made by increasing or decreasing an engine's thrust request, i.e., differentially throttling each engine. The resulting asymmetrical thrust induced by this action will apply a torque to the vehicle in the horizontal plane which will require corrective action by the autopilot to maintain aircraft heading. The primary constraint that must be maintained in achieving the optimization objective is that the airspeed of the aircraft remains at its requested value after the DSFC fuel minimization algorithm is engaged.

The calculation of DSFC will now be discussed. The pertinent mathematical relationships that we must examine are:

$$SFC = \frac{W}{F}$$

$$DSFC = SFC + F\frac{d(SFC)}{dF}$$

To compute these relationships, access to fuel flow and net thrust data is required. The FADEC instrumentation suite measures fuel flow and this quantity is accessible via an aircraft data bus. The engine model program which also resides in the FADEC produces accurate estimates of net thrust at update intervals compatible with ECONOTHRUST subsystem needs. In most cases the engine model thrust estimates reflect any off-nominal performance that a particular engine may be exhibiting. This feature of the net thrust estimate will significantly enhance ECONOTHRUST subsystem optimization performance. Oftentimes, the engine models used in a FADEC will factor in the time that has elapsed since the engine was initially installed or last had a major servicing or overhaul. This off-nominal performance estimation is particularly relevant for engines in the latter stages of their lifecycle or in the time interval prior to a major overhaul where performance deterioration is usually non-negligible.

The thrust estimate can also be acquired by the ECONOTHRUST processor from an avionics data bus. With the availability of these two quantities, the DSFC computations can be handled in a straight-forward manner. In most FADEC systems, fuel flow and net thrust are available at data rates in the neighborhood of 20 to 50 samples per second. For the DSFC update rates of around one update per minute, considerable smoothing of the fuel flow and net thrust signals can be applied prior to the discrete-time derivative calculations. To insure that airspeed is maintained at the desired set-point during the DSFC optimization operation, the velocity estimates computed by the navigation system in the FMS can be accessed via an aircraft data bus.

The transformation of DSFC information to incremental throttle corrections is straight-forward. For example, consider a two-engine aircraft: The object is to force $DSFC_1$ to equal $DSFC_2$ which is done by comparing these two quantities in the following manner:

$$DSFC_{diff} = DSFC_1 - DSFC_2$$

The individual correction terms depend on both the sign and magnitude of $DSFC_{diff}$ such that:

$$DSFC_{cor}^1 = \begin{cases} -DSFC_{diff} & DSFC_{diff} > 0 \\ +DSFC_{diff} & DSFC_{diff} < 0 \end{cases}$$

$$DSFC_{cor}^2 = \begin{cases} +DSFC_{diff} & DSFC_{diff} > 0 \\ -DSFC_{diff} & DSFC_{diff} < 0 \end{cases}$$

Each computed $DSFC_{cor}^i$ requires a functional relationship that maps these correction terms to an incremental throttle command. This mapping relationship can be extracted from an engine simulation or derived empirically via standard curve fitting techniques for each individual engine. The incremental throttle command will be sent by the ECONOTHRUST processor to each FADEC via a data bus.

The algorithm discussed above only considers perturbations to fuel flow and uses differential throttle settings as a means of achieving the desired DSFC optimization. This aspect of the ECONOTHRUST algorithm is limited in application to multi-engine aircraft. An additional feature of the ECONOTHRUST subsystem involving the optimization of the Thrust Specific Fuel Consumption (TSFC) problem addresses the fuel minimization for individual engines. This aspect of the ECONOTHRUST subsystem would enable the ECONOTHRUST subsystem to be beneficially installed in single engine aircraft, e.g., the F-16 and Joint Strike Fighter (JSF). This aspect of the ECONOTHRUST subsystem exploits the larger control effector set offered by modern variable geometry turbofan engines. The enlarged control effector set includes variable stator vanes on the compressor and in the case of military engines the variable nozzle area. The use of these control effectors to optimize thrust specific fuel consumption (TSFC) was demonstrated in a NASA/Dryden Research Center (DRC) program in the late 1980's, i.e., Highly Integrated Digital Engine Control (HIDEC)/Performance Seeking Control (PSC) program. There are advantages to this approach. First, the fuel optimization algorithm becomes more localized, i.e., the performance capability of each engine is directly addressed and optimized. Secondly, the HIDEC/PSC results indicated that the most potent effector for minimizing TSFC was offsetting the nominal compressor vane schedules within the engine control.

Figure 3:
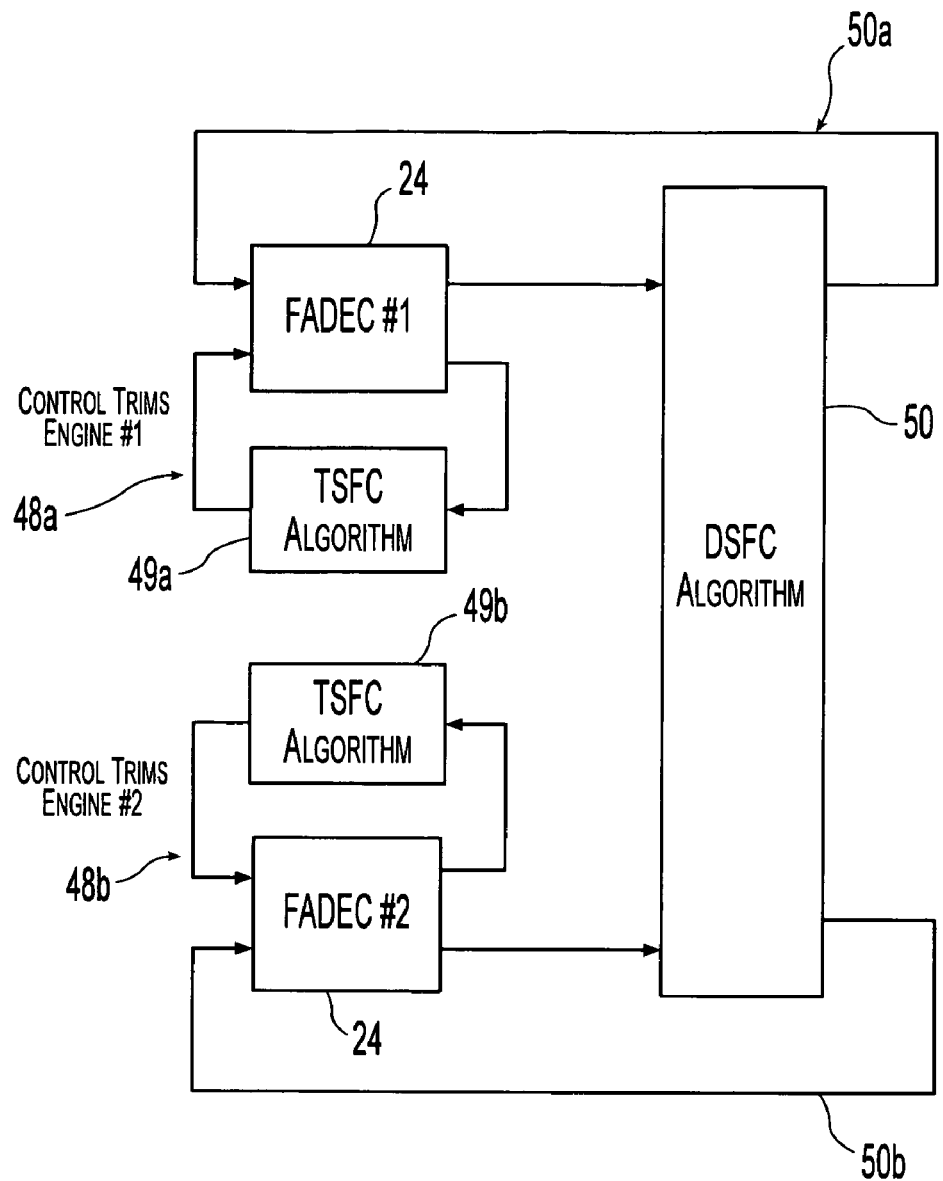
FIG. 3 is a schematic view of the looped communications employed by the ECONOTHRUST algorithm.
Figure 4:
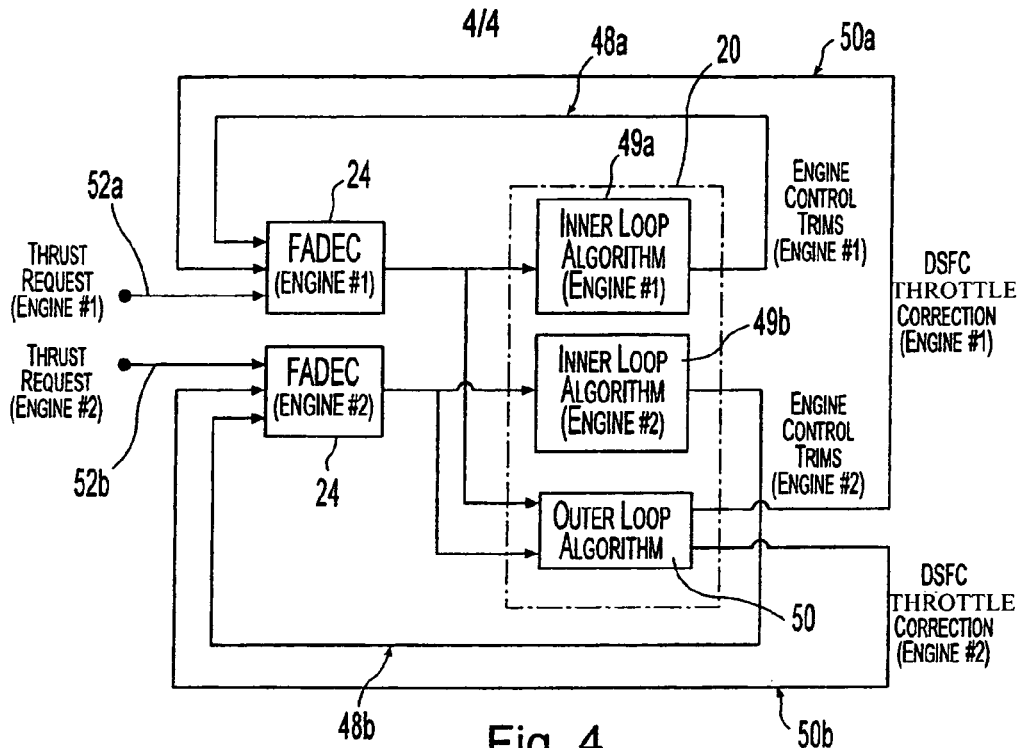
FIG. 4 is a schematic view of the ECONOTHRUST processor and two FADEC processors.

The ECONOTHRUST subsystem disclosed herein utilizes a two-tiered (hybrid) algorithm which fuses both the local (single-engine optimization) and DSFC (multi-engine optimization) methods of optimizing fuel consumption. FIGS. 3 and 4 are similar and illustrate the salient features of this hybrid algorithm. As can be seen in FIGS. 3 and 4, the two-tiered hybrid approach includes an "inner loop" 48a, 48b for each of the engines. The inner loop is used to provide communication between each FADEC and an engine optimization algorithm on the ECONOTHRUST processor 20. A separate inner loop is used with each of the individual engines and the embodiment depicted in FIGS. 3 and 4 represents a two-engine aircraft. A separate engine optimization algorithm 49a, 49b is run on the ECONOTHRUST processing platform 20 for each engine and is in communication with the FADEC for the appropriate engine. In the illustrated embodiment, the engine optimization algorithms are algorithms which optimize the TSFC of the engine.

The DSFC algorithm 50 is also run on the ECONOTHRUST processing platform 20 and is in communication with each FADEC processor. The DSFC algorithm 50 forms an "outer loop" 50a, 50b with the FADEC 24 of each of the engines to communicate throttle adjustments determined by the DSFC algorithm. It is noted that the serial buses 46 schematically depicted in FIG. 3 are shown in a looped configuration to provide graphical clarity to the looped nature of the communication flow, the actual configuration of the physical serial buses 46 which provide this looped communication flow may differ from that depicted in the Figures.

The inner loops 48a, 48b depicted in FIG. 3 represent the flow of information between the FADEC and the TSFC algorithm for each of the engines. In these inner loops 48a, 48b, each FADEC communicates three main types of information to a respective TSFC algorithm. These three types of information are (a) measured engine inputs (e.g., fuel flow, variable geometry settings, compressor stability bleeds, rotor speeds, and inlet conditions), (b) measured engine outputs (e.g., gas path temperature and pressure at critical engine stations), and (c) engine performance estimates (e.g., estimated thrust). The TSFC algorithm utilizes this information to generate control trims for the engine that will maximize the fuel efficiency of the engine for the specific level of thrust being requested from that engine. These engine control trims are then communicated from the TSFC algorithm, which is resident on the ECONOTHRUST processor 20, to the FADEC. It is this cyclic flow of information for the first and second engines 56, 57 that respectively form the inner loops 48a, 48b.

For example, if the first and second engines 56, 57 are turbofan engines having repositionable compressor vanes, the control trims determined by the TSFC algorithm may take the form of an adjustment to the compressor vane positions. Similarly, if the engines 56, 57 are turbofan engines having variable diameter nozzles, the control trims determined by the TSFC algorithm may take the form of adjustments to the nozzle diameter.

The outer loops 50a, 50b represent the flow of information between the FADEC of each engine and the DSFC algorithm which is resident on the ECONOTHRUST processor 20. In these outer loops 50a, 50b, each FADEC communicates information to the DSFC algorithm. This information includes (a) airspeed, (b) throttle settings, (c) estimated thrust and (d) fuel flow. The DSFC utilizes this information to generate throttle adjustments for each engine which seek to substantially equalize the differential specific fuel consumption of each of the engines 56, 57. These throttle adjustments are then communicated from the DSFC algorithm to the FADEC for each engine. It is this cyclic flow of information for the first and second engines 56, 57 that respectively form the outer loops 50a, 50b.

This two-tiered or hybrid approach has the potential for extracting additional fuel savings and reducing the detrimental drag induced by large asymmetrical thrust commands when compared to the use of the DSFC approach alone. This is because it is envisioned that for most multi-engine aircraft, the optimization of the TSFC for each engine will reduce the asymmetry of the thrust requests generated by the DSFC optimization algorithm. More specifically, since each engine will be trimmed to minimize its fuel consumption, it is thought that this will decrease the differences in fuel efficiency between engines. This will, in turn, reduce the asymmetric nature of the thrust request generated by the DSFC algorithm. Hence, the two-tiered optimization should result in additional fuel savings (over individual engine TSFC optimizations and DSFC optimization) by enhancing the performance of each individual engine (TSFC inner loop) and minimizing the need for intervention due to DSFC optimization (outer loop). This reduced intervention and corresponding reduction in asymmetric thrusts will reduce the need to counteract the disturbance torque on the aircraft which erodes the fuel usage savings.

Figure 5:
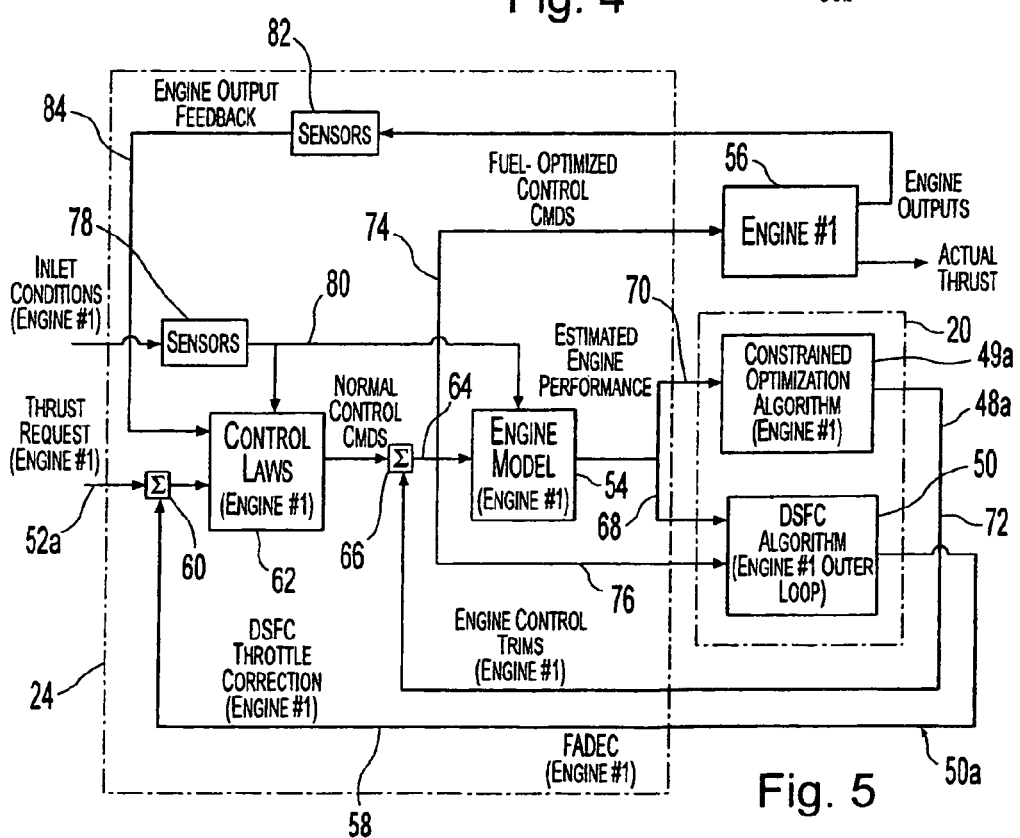
FIG. 5 is a schematic view of the ECONOTHRUST processor and one FADEC and its associated engine.

FIG. 5 provides a more detailed schematic illustration of how the ECONOTHRUST processor 20 interacts with the aircraft when implementing the TSFC and DSFC algorithms. In this regard, it is noted that FIG. 5 illustrates only that part of the system relevant to the operation of first engine 56. Each of the other engines on the aircraft operates in a similar manner. As seen in FIG. 5, a key element in the implementation is the use of an engine model 54 and the engine optimization algorithm 49a. While FIG. 5 illustrates a TSFC algorithm 49a for engine #1 in the form of a constrained optimization algorithm, other types of algorithms that may alternatively be utilized for the engine optimization algorithm 49a are discussed below. The illustrated TSFC algorithm 49a is used to generate trim signals which are added to the initial engine control commands generated by the control law program 62 of the FADEC.

More specifically, when the ECONOTHRUST processor 20 is activated during operation of the aircraft, each of the FADEC processors 24 will communicate with the ECONOTHRUST processor 20 in both an inner loop, e.g., 48a, 48b, and an outer loop, e.g., 50a, 50b. FIG. 5 illustrates the inner and outer loops for the first engine 56 in greater detail than the schematic views of FIGS. 3 and 4. As can be seen in FIG. 5, a throttle request signal is communicated to the FADEC 24 via communication path 52*a*. This external throttle request 52*a* is generated by a source external to the ECONOTHRUST subsystem. The external throttle request 52*a* will typically be a function of input generated by a pilot of the aircraft. The pilot may generate this signal either directly or indirectly. For example, the pilot could directly generate the external throttle request by operating a throttle control or indirectly generate the throttle signal by inputting data into a flight control system that, in turn, generates the external throttle request. The sum of the external throttle requests correspond to a desired airspeed. During cruise conditions, the aircraft will typically be operated in a manner to maintain a steady desired airspeed. As the aircraft encounters differing external conditions, the sum of the external throttle requests will often have to be adjusted to maintain the aircraft at the desired airspeed. At location 60 on path 52*a* upstream of a control laws program 62 resident on the FADEC processor, an incremental throttle adjustment is summed with the original throttle request. The resulting adjusted throttle value is processed by the control laws program 62 of the FADEC which converts the adjusted throttle request into a set of initial engine control commands, e.g., fuel flow, variable vane positions for the compressor and, if applicable, variable exit nozzle area. Typically, only military aircraft have a variable exit nozzle area.

The initial engine control commands are communicated from the control law program 62 to the engine model 54 via a communication path 64. Incremental adjustments are summed with the initial engine control commands output by the control law program 62 at point 66 on communication path 64 producing adjusted engine control commands. Branching off from communication path 64 downstream of summing location 66 and upstream of engine model 54 are communication paths 74 and 76. Communication path 74 communicates the adjusted engine control commands to the first engine 56 as a set of first engine control signals while communication path 76 communicates the first engine control signals to the DSFC algorithm 50 resident on the ECONOTHRUST processor 20. The engine model 54 estimates various engine performance parameters utilizing the engine control signals. These estimated engine performance values will typically include thrust, airflow capacity, stall margin, rotor speeds and temperatures and pressures at several locations along the gas path. In the illustrated embodiment, engine model 54 estimates the contemporaneous thrust value of the engine as a function of the life-cycle status of the engine. The estimated engine performance values are then communicated to the TSFC algorithm 49*a* (which in the embodiment of FIG. 5 is a constrained optimization algorithm) via communication path 70 and to the DSFC algorithm via communication path 68.

The inner loop 49*a* for the first engine 56 will first be traced. The TSFC algorithm 49*a* determines an optimized value for each of the engine control commands output by the control laws program 62. These values seek to optimize fuel efficiency for the specific thrust being requested from the engine at the current operating conditions of the aircraft. The TSFC algorithm 49*a* then communicates any resulting engine control command adjustments to the FADEC 24 via communication path 72. The adjustment values are then summed with the initial engine control commands being output by the control law program 62 at location 66. Thus, as depicted in FIG. 5, the inner loop 48*a* is formed by Engine Model 54, communication path 70, TSFC algorithm 49*a*, communication path 72 and communication path 64 from point 66 to Engine Model 54.

The outer loop 50*a* for the first engine 56 will now be traced. The DSFC algorithm 50 determines desired throttle values for each of the different engines for optimum fuel efficiency by seeking to substantially equalize the differential specific fuel consumption of all the engines and calculates a throttle adjustment for each engine to obtain the desired throttle values. The throttle adjustment value for the first engine 56 is communicated to the FADEC 24 for the first engine 56 via communication path 58. The throttle adjustment is then summed with the external throttle request value at location 60 on communication path 52*a* upstream of control laws program 62. The control laws program 62 outputs initial engine control commands which are communicated via path 64. The initial engine control commands are adjusted at location 66 and the resulting engine control signals are then communicated to engine model 54 via path 64, to first engine 56 via path 74 and to the DSFC algorithm 50 via path 76. Most notably, the adjusted fuel flow value for the first engine 56 is communicated to the DSFC algorithm 50 via path 76. The engine model 54 estimates engine performance parameters and communicates these values to the DSFC algorithm 50 via path 68. Most notably, a contemporaneous estimated thrust value determined by engine model 54 for the first engine 56 is communicated to the DSFC algorithm 50 via path 68. Thus, as depicted in FIG. 5, the outer loop 50*a* is formed by the DSFC algorithm 50, communication path 58, communication path 52*a* from point 60 to the control laws program 62, and communication path 64 to point 66. At point 66, outer loop 50*a* forms two parallel branches. One branch leads from point 66 via path 64 to engine model 54 and then via path 68 to DSFC algorithm 50. The other branch leads from point 66 to DSFC algorithm 50 via path 76.

As mentioned above, the communication flow also extends to the first engine 56. Communication path 74 conveys the adjusted engine control commands to first engine 56. Communication path 84 returns signals from the first engine 56 to the control laws program 62 of the FADEC 24 for the first engine 56. A conventional suite of sensors 82 for measuring engine output conditions are included in this communication path 84. The output signals of sensors 82 are communicated to control laws program 62 via path 84. Sensors 82 measure a variety engine parameters such as the temperature and pressure at critical locations of the gas path within the engine.

The control laws program 62 also receives the output signals generated by sensors 78. The output signals of sensors 78 correspond to the inlet conditions for the first engine 56 such as the outside (ambient) air temperature, static free stream pressure, impact (differential pressure), and aircraft angle of attack. These signals are communicated to the control laws program 62 and the engine model 54 via communication path 80.

One assumption inherent in this embodiment is that the engine model accurately captures engine gas path performance. Engine performance is encapsulated in the estimates of rotor speeds, pressures, temperatures, and thrust. With this information, the optimization algorithm searches for a solution that minimizes TSFC while simultaneously satisfying engine physical/structural constraints. The output of the optimization algorithm is a set of incremental control signals that modify the nominal engine control commands.

This approach is viable because the engine model has the ability to adapt to incremental changes in gas path performance. Many contemporary aircraft employ a rating system to accommodate for deterioration of engine performance based upon the time elapsed since the engine was initially installed or last had a major servicing or overhaul. Such ratings systems will typically inflate fuel consumption to insure that the required thrust level is met for worst case engine deterioration conditions. The trim signals provided by the TSFC optimization algorithm discussed herein directly accommodate the effects of normal engine deterioration and enable the recovery of TSFC at any point in the engine lifecycle. Hence, the engine rating system can be disabled when the ECONOTHRUST subsystem is engaged. In this regard, it is noted that the typical nominal engine rating system not only expends excess fuel during cruise conditions but will unnecessarily expend significant amounts of fuel during take-off operations.

A fundamental issue in the real-time implementation of complex algorithms such as the TSFC and DSFC algorithms is the selection of a computational architecture that meets the throughput requirements of the system. Two alternative computer systems that will support the proposed algorithmic computational requirements, data bus communication interfaces with other aircraft systems, and graphical user interfaces (GUI) to support pilot interaction will now be discussed. The first is a field programmable gate array (FPGA) architecture. From power-consumption, weight, volume, computational capability, and architectural flexibility metrics, FPGAs are a very attractive candidate among the computing systems. Presently, two of the dominant FPGA manufacturers are Xilinx and Altera. Both offer a full line of system boards, support for standard external interfaces (e.g. ARINC 429 and Mil. Std. 1553 bus interfaces, RS232 communication ports, etc.), and system development/testing software. The down side of FPGAs is the difficulty one encounters when attempting to program these devices. Without an experienced core of FPGA firmware developers, the financial and schedule costs can become prohibitive.

More conventional computational platforms can also be used to implement the present invention. Multi-core processors manufactured by Intel and AMD provide an alternative computing platform to FPGAs. The parallel architectures of these devices provide enhanced performance, reduced power consumption, and more efficient simultaneous processing of multiple tasks. The ECONOTHRUST algorithm can be partitioned into multiple threads that exploit the capabilities of such multi-core processors. One approach is to divide the multi-tiered algorithm into multiple tasks using a multi-sample rate criterion. For example, the individual engine TSFC optimizations (ECONOTHRUST inner loop) could be performed at a higher update rate than the DSFC optimization (ECONOTHRUST outer loop). In such an embodiment, each engine's constrained optimization algorithm computational cycle could be performed over a one-second time interval whereas the outer loop DSFC computational cycle would occur over a one-minute time interval.

In addition, the individual optimization calculations can be partitioned into separate tasks along engine lines. For example, consider a two-engine aircraft. Since each engine TSFC optimization (ECONOTHRUST inner-loop calculations) is independent of the other, the calculations for Engine #1 could be assigned to Core #1 on the multi-core processor, while the calculations for Engine #2 would be assigned to Core #2. Hence, the multi-core processor can be efficiently configured with software to perform both engine optimizations simultaneously. The local optimization of an engine's TSFC metric by the engine optimization algorithm will now be discussed. The engine optimization algorithm will need to be customized for the particular type of engine deployed in the aircraft. The appropriate TSFC optimization algorithm can be formulated as a linear programming problem. A real-time implementation of this concept was successfully demonstrated in 1990 on the HIDEC/PSC test aircraft. The test aircraft was an F-15 owned and operated by NASA/Dryden Research Center with an integrated digital avionics system that was state-of-the-art 1985 technology. The HIDEC/PSC linear programming (LP) algorithm provide a systematic methodology for exploring the multi-dimensional control effector space for a Pratt-Whitney F-100 turbofan engine. The outputs of the LP-algorithm were incremental trims that the FADEC applied to the nominal control vector that it computed. This approach reduced the TSFC by one to three percent with the variation occurring as a function of flight envelope location (i.e., altitude/Mach number). In addition to the use of Linear Programming methods, the use of more advanced concepts such as nonlinear constrained optimization techniques are also feasible means for solving the TSFC optimization problem. Constrained optimization is a well established and extensively documented concept and the present disclosure does not involve unique developments in the constrained optimization area. Instead, known constrained optimization techniques are described and are disclosed as one alternative in the implementation of the multi-tiered ECONOTHRUST algorithm. In this regard, a general statement of the constrained optimization problem formulation is described below and then its application in the ECONOTHRUST algorithm is examined.

In general, optimization problems are formulated by specifying an optimization criterion expressed in terms of a set of variables that can be manipulated to minimize or maximize the optimization criterion. We can partition the optimization problem into two distinct groups. In one group the independent variables are unconstrained which provides maximum flexibility in solving the optimization problem but does not reflect limitations imposed by real-world applications. Alternatively, we can interject into the problem formulation the known physical limitations of the system which results in the so-called constrained optimization problem. Stated mathematically, the constrained optimization problem is expressed as:

Constrained Optimization Problem $$P: \min_x f(x)$$
$$\text{s.t. } g(x) \le b$$
$$x \in X$$

In these expressions, the cost (penalty) function that we are attempting to minimize is denoted by $f(\bullet)$. Potentially, $f(\bullet)$ has many local minima, but the search algorithm employed in the optimization algorithm is designed to find the global minimum by systematically manipulating the control vector, x. Note that in general $f(\bullet)$ is a scalar value whereas x is a vector (array) quantity. The constraints imposed by the problem of interest are reflected through the vector-valued function $g(\bullet)$ and the limitation on the control variables x which must be contained within the specified set, X. For example, a common limit imposed on the control variables is that they must all be positive, real numbers, which is expressed mathematically as, $x \ge 0$.

In the ECONOTHRUST application, the cost function, $f(\bullet)$, is thrust specific fuel consumption which is defined as a ratio of fuel flow and thrust, i.e., Fuel-Flow/Thrust. To achieve the minimization objective we will attempt to decrease fuel flow while maintaining thrust at a fixed level. Elements of the control vector that we can manipulate include 1) fan rotor speed, 2) engine airflow, 3) engine pressure ratio (EPR), and 4) temperatures in the hot section of the engine. The constraints expressed by $g(\bullet)$ impose limitations on the amount of manipulation that we can apply to elements of the control vector. These limits include over-speed on engine rotors, minimum allowable stall margins, and temperature limits on hot section structures.

To solve this problem, the Lagrange multiplier technique is used to transform the constrained optimization problem into an unconstrained problem. Lagrange multipliers appear in the reformulated optimization objective in the following manner:
Unconstrained Optimization Problem $$P: \min_{x,\lambda}[f(x) + \lambda^T(g(x) - b)]$$

where $\lambda$ is a one-dimensional array of Lagrange multipliers. To determine the desired values of x and $\lambda$, one needs to compute the gradient (first derivative) of:

$$f(x) + \lambda^T(g(x) - b)$$

and set the resulting set of equations to zero.

To determine which solutions correspond to the minima in this problem formulation, one needs to compute the Hessian (matrix) which is the second derivative of the modified objective function. Solutions that produce a positive-definite Hessian matrix are the desired minima to the optimization problem.

There are a large number of documented algorithms designed to numerically solve the constrained optimization problem that is set forth above. The taxonomy of these algorithms includes:

1. Linear Programming: Objective function and constraints are linear functions.
2. Quadratic Programming: Objective function is a quadratic function whereas constraints are linear functions.
3. Nonlinear Programming: One or more of the constraints are general nonlinear functions with no restriction on the objective function.
4. Linearly Constrained Optimization: Constraints are linear functions with no specific requirement on objective function.
5. Bound-Constrained Optimization: All of the constraint functions are express in terms of upper or lower bounds.
6. Convex Programming: Objective function is convex and constraint functions are concave.

The implementation of an efficient optimization algorithm depends on the particular properties and structure of the objective and constraint functions. Regardless of which algorithm is selected, the basic mode of operation is similar. All of these algorithms generate a sequence of guesses for the solution vector, x, and Lagrange multipliers, $\lambda$. Each algorithm possesses a set of methodologies for directing the next guess towards the desired solution and metrics for terminating the solution search. The inner-loop optimization of the multi-tiered ECONOTHRUST algorithm can be formulated with any of these algorithms. The computational platforms for the ECONOTHRUST subsystem have the computational capability to host these optimization algorithms.

While an ECONOTHRUST processor 20 can be installed during the initial manufacture of an aircraft, it is also well-suited for installation in existing aircraft. The ECONOTHRUST processor provides a computational module 20 that can be installed in existing aircraft having a digital avionics system with multiple engines and corresponding FADEC systems. To fully exploit the advantages of the ECONOTHRUST processor 20, it is advantageous to allow the personnel operating the aircraft to selectively deactivate the DSFC algorithm 50 while the aircraft is in flight and allow the engine optimization algorithms 49a, 49b, to be selectively operational when the DSFC algorithm is deactivated. This will allow the pilots to optimize the fuel efficiency of the engines 56, 57 using the engine optimization algorithms 49a, 49b when the DSFC algorithm is deactivated. For example, this combination of features might be particularly useful during dynamic situations such as take-off and landing operations. This ability of the engine optimization algorithms 49a, 49b of the ECONOTHRUST processor 20 to obtain fuel efficiencies from individual engines without the activation of the DSFC algorithm 50 expands the potential uses of ECONOTHRUST processors 20. More specifically, this aspect of the ECONOTHRUST processor 20 means that processors 20 can be installed in single engine aircraft and produce fuel efficiencies. Although the DSFC algorithm 50 resident on any ECONOTHRUST processor 20 installed in a single engine aircraft would have no applicability, one of the engine optimization algorithms resident on the ECONOTHRUST processor 20 could be used with the singe engine of the aircraft to improve the fuel efficiency of that engine.

While this invention has been described as having an exemplary design, the present invention may be further modified within the spirit and scope of this disclosure. This application is therefore intended to cover any variations, uses, or adaptations of the invention using its general principles.

What is claimed is:

1. A method for improving fuel efficiency in an aircraft having a digital avionics system and at least first and second engines wherein the digital avionics system communicates first control signals from a first full-authority digital engine control (FADEC) system to the first engine to thereby control operating parameters of the first engine and communicates second control signals from a second full-authority digital engine control (FADEC) system to the second engine to thereby control operating parameters of the second engine, said method comprising:

providing at least one processor programmed with a differential specific fuel consumption (DSFC) algorithm, a first engine optimization algorithm and a second engine optimization algorithm; and communicatively coupling the at least one processor and the DSFC algorithm through a first outer loop with the first FADEC system and through a second outer loop with the second FADEC system, and communicatively coupling the first engine optimization algorithm through a first inner loop with the first FADEC system and the second engine optimization algorithm through a second inner loop with the second FADEC system, wherein implementation of the DSFC algorithm, first engine optimization algorithm and second engine optimization algorithm by the at least one processor during operation of the aircraft includes:

(a) determining first and second desired thrust values for the first and second engines respectively as a function of estimated differential specific fuel consumption of each of the first and second engines with the DSFC algorithm; determining first and second DSFC throttle adjustments for the first and second engines respectively as a function of the first and second desired thrust values and contemporaneous estimated thrust values for the first and second engines; and communicating the first and second DSFC throttle adjustments to the first and second FADEC systems respectively;

(b) determining a first adjustment to at least one operating parameter of the first engine as a function of fuel efficiency and the desired first thrust value for the first engine with the first engine optimization algorithm and communicating the first adjustment to the first FADEC system; and (c) determining a second adjustment to at least one operating parameter of the second engine as a function of fuel efficiency and the desired second thrust value for the second engine with the second engine optimization algorithm and communicating the second adjustment to the second FADEC system.

2. The method of claim 1 wherein the digital avionics system includes first and second engine model programs which estimate performance of the first and second engines respectively and wherein the contemporaneous estimated thrust values for the first and second engines are determined by the first and second engine models respectively.

3. The method of claim 2 wherein the first and second engine model programs estimate thrust values for the first and second engines as a function of a life-cycle status of each respective one of the first and second engines.

4. The method of claim 1 wherein the first and second engines are each turbofan engines having repositionable compressor vanes and the first and second adjustments adjust compressor vane positions of the first and second engines respectively.

5. The method of claim 1 wherein the first and second engines are each turbofan engines having variable diameter nozzles and the first and second adjustments adjust nozzle diameters of the first and second engines respectively.

6. The method of claim 1 wherein the DSFC algorithm estimates a value of induced drag acting on the aircraft by asymmetrical thrust exerted by the first and second engines, and determines the first and second desired thrust values as a function of the estimated induced drag value.

7. The method of claim 1 further comprising the step of providing a graphical user interface to display operational data to personnel piloting the aircraft wherein the operational data includes estimated thrust distribution for the at least first and second engines.

8. The method of claim 7 wherein the operational data further includes an estimated value of drag caused by assymetrical thrust exerted by the at least first and second engines.

9. The method of claim 1 wherein each of the first and second engine optimization algorithms and the DSFC algorithm each generate output at a predetermined rate and wherein the first and second engine optimization algorithms operate at a faster rate than the DSFC algorithm.

10. The method of claim 1 wherein the step of providing at least one processor includes providing a field programmable gate array.

11. The method of claim 1 wherein the step of providing at least one processor includes providing a multi-core processor.

12. The method of claim 1 wherein the DSFC algorithm is selectively deactivated by personnel operating the aircraft while the aircraft is in flight.

13. The method of claim 12 wherein the first and second optimization algorithms are selectively operational when the DSFC algorithm is deactivated.

14. A method for improving fuel efficiency in an aircraft having a digital avionics system and at least first and second engines wherein the digital avionics system communicates first control signals from a first full-authority digital engine control (FADEC) system to the first engine to thereby control operating parameters of the first engine and communicates second control signals from a second full-authority digital engine control (FADEC) system to the second engine to thereby control operating parameters of the second engine, and wherein each of the first and second FADEC systems include a control laws program that generates initial engine control commands as a function of a received throttle value and an engine model program that estimates performance values for an associated one of the engines as a function of received engine control signals, the estimated performance values including a contemporaneous estimated thrust value; said method comprising:

communicating an externally generated throttle value to each FADEC;

providing at least one processor programmed with a differential specific fuel consumption (DSFC) algorithm, a first engine optimization algorithm and a second engine optimization algorithm; and communicatively coupling the at least one processor and the DSFC algorithm through a first outer loop with the first FADEC system and through a second outer loop with the second FADEC system, and communicatively coupling the first engine optimization algorithm through a first inner loop with the first FADEC system and the second engine optimization algorithm through a second inner loop with the second FADEC system, wherein implementation of the DSFC algorithm, first engine optimization algorithm and second engine optimization algorithm by the at least one processor during operation of the aircraft includes:

(a) determining first and second desired thrust values for the first and second engines respectively as a function of estimated differential specific fuel consumption of each of the first and second engines and the externally generated throttle values with the DSFC algorithm; determining first and second DSFC throttle adjustments for the first and second engines respectively as a function of the first and second desired thrust values and the contemporaneous estimated thrust values for the first and second engines; and communicating the first and second DSFC throttle adjustments to the first and second FADEC systems respectively wherein the first and second DSFC throttle adjustments are combined with a respective one of the externally generated throttle values to define an adjusted throttle value and the adjusted throttle values are communicated to the control laws module of each FADEC system for use in determining initial engine control commands;

(b) determining a first adjustment to at least one operating parameter of the first engine corresponding to at least one of the engine control command signals generated by the control law program of the first FADEC system; the first adjustment being determined as a function of fuel efficiency and the first desired thrust value for the first engine with the first engine optimization algorithm and communicating the first adjustment to the first FADEC system; defining at least one of the first control signals as a function of one of the initial engine control commands generated by the control law program of the first FADEC and the first adjustment; communicating the at least one first control signal to the engine model program of the first FADEC and using the at least one first control signal in the determination of the contemporaneous estimated thrust value for the first engine; and communicating the contemporaneous estimated thrust value for the first engine to the at least one processor for use in the DSFC algorithm and the first engine optimization algorithm; and (c) determining a second adjustment to at least one operating parameter of the second engine corresponding to at least one of the engine control command signals generated by the control law program of the second FADEC system; the second adjustment being determined as a function of fuel efficiency and the second desired thrust value for the second engine with the second engine optimization program and communicating the second adjustment to the second FADEC system; defining at least one of the second control signals as a function of one of the initial engine control commands generated by the control law program of the second FADEC and the second adjustment; communicating the at least one second control signal to the engine model program of the second FADEC and using the at least one second control signal in the determination of the contemporaneous estimated thrust value for the second engine; and communicating the contemporaneous estimated thrust value for the second engine to the at least one processor for use in the DSFC algorithm and the second engine optimization algorithm.

15. The method of claim 14 wherein the engine model programs of the first and second FADEC systems estimate thrust values for the first and second engines as a function of a life-cycle status of each respective one of the first and second engines.

16. The method of claim 14 wherein the first and second engines are each turbofan engines having repositionable compressor vanes and the first and second adjustments adjust compressor vane positions of the first and second engines respectively.

17. The method of claim 14 wherein the first and second engines are each turbofan engines having variable diameter nozzles and the first and second adjustments adjust nozzle diameters of the first and second engines respectively.

18. The method of claim 14 wherein the DSFC algorithm estimates a value of induced drag acting on the aircraft by asymmetrical thrust exerted by the first and second engines, and determines the first and second desired thrust values as a function of the estimated induced drag value.

19. The method of claim 14 further comprising the step of providing a graphical user interface to display operational data to personnel piloting the aircraft wherein the operational data includes estimated thrust distribution for the at least first and second engines.

20. The method of claim 14 wherein each of the first and second engine optimization algorithms and the DSFC algorithm each generate output at a predetermined rate and wherein the first and second engine optimization algorithms operate at a faster rate than the DSFC algorithm.

21. A computational module installable in an aircraft having a digital avionics system and at least first and second engines wherein the digital avionics system communicates first control signals from a first full-authority digital engine control (FADEC) system to control operating parameters of the first engine and communicates second control signals from a second full-authority digital engine control (FADEC) system to control operating parameters of the second engine and wherein the digital avionics system further includes first and second engine model programs for estimating performance of the first and second engines respectively, said computational module comprising:

at least one processor programmed with a DSFC algorithm, a first engine optimization algorithm and a second engine optimization algorithm, said at least one processor and the DSFC algorithm being communicatively coupled through a first outer loop with the first FADEC system and through a second outer loop with the second FADEC system, said first engine optimization algorithm is communicatively coupled through a first inner loop with the first FADEC system and said second engine optimization algorithm is communicatively coupled through a second inner loop with the second FADEC system, wherein when said DSFC algorithm, said first engine optimization algorithm and said second engine optimization algorithm are implemented by said at least one processor during operation of the aircraft, said at least one processor:

(a) determines first and second desired thrust values for the first and second engines respectively as a function of estimated differential specific fuel consumption of each of the first and second engines with said DSFC algorithm; determines first and second DSFC throttle adjustments for the first and second engines respectively as a function of the first and second desired thrust values and contemporaneous estimated thrust values for the first and second engines obtained from the first and second engine models respectively; and communicates the first and second DSFC throttle adjustments to the first and second FADEC systems respectively;

(b) determines a first adjustment to at least one operating parameter of the first engine as a function of fuel efficiency and the desired first thrust value for the first engine with said first engine optimization algorithm and communicates the first adjustment to the first FADEC system; and (c) determines a second adjustment to at least one operating parameter of the second engine as a function of fuel efficiency and the desired second thrust value for the second engine with said second engine optimization algorithm and communicates the second adjustment to the second FADEC system.

22. The computational module of claim 21 wherein the first and second adjustments adjust compressor vane positions of a turbofan engine having repositionable compressor vanes.

23. The computational module of claim 21 wherein the first and second adjustments adjust nozzle diameters of turbofan engines having variable diameter nozzles.

24. The computational module of claim 21 further comprising a graphical user interface, said interface displaying operational data to personnel piloting the aircraft wherein the operational data includes estimated thrust distribution for the at least first and second engines.

25. The computational module of claim 24 wherein the operational data displayed by the interface further includes an estimated value of drag caused by assymetrical thrust exerted by the at least first and second engines.

26. The computational module of claim 21 wherein each of said first and second engine optimization algorithms and said DSFC algorithm each generate output at a predetermined rate and wherein said first and second engine optimization algorithms operate at a faster rate than said DSFC algorithm.

27. The computational module of claim 21 wherein said at least one processor includes a field programmable gate array.

28. The computational module of claim 21 wherein said at least one processor includes a multi-core processor.

* * * * *